Dec. 13, 1960    P. C. HENDRICKSON ET AL    2,963,793
DRAFTSMAN'S TEMPLATE
Filed May 4, 1959

INVENTORS
PAUL C. HENDRICKSON
DONALD C. JOHNSON
BY
William P. Sewald
ATTORNEY

2,963,793
DRAFTSMAN'S TEMPLATE

Paul C. Hendrickson and Donald C. Johnson, both of 21940 Karam Court, Warren, Mich.

Filed May 4, 1959, Ser. No. 810,878

1 Claim. (Cl. 33—174)

This invention generally relates to a draftsman's template and more particularly pertains to a gear tooth template having an adjustable radial distance from selected center turning points.

Draftsman templates have been employed heretofore to facilitate the drawing of tooth gears on engineering drawings, however, the several devices of the prior art have not proved entirely satisfactory inasmuch as they do not provide a definite turning center and cannot be secured or adjusted for definite radial extent, so that the teeth as drawn cannot be controlled by the template itself but rather the draftsman must rely upon visual accuracy and dexterity entirely.

With the foregoing in view, the primary object of the invention is to provide a gear tooth template for drawing gear teeth which is simple in design and construction, inexpensive to manufacture, easy to use, and easy to adjust and secure for various definite radial distances and turning points relative to various selected gear tooth profiles of graduated size on the template.

An object of the invention is to provide a template having teeth graduated in size along one edge and slots aligned along the center radius of each graduated gear tooth.

An object of the invention is to provide a cross-bar disposed transversely on said plate across said slots and adjustably movable along said slots.

An object of the invention is to provide a slot in the movable bar which forms a communicating aperture through the bar to the various slots in the template with the bar and template slots points of intersection forming communicating apertures through both the bar and the plate at the point of the bar slot juncture with the template slots.

An object of the invention is to provide a pin disposable through the juncture of the bar and template slots which is embedable therethrough to the drawing board and for holding the template on a circular center.

An object of the invention is to provide means for clamping the bar in its adjusted position radially of the gear teeth profiles.

An object of the invention is to provide a template having at least one tooth having an extending center radius with spaced apertures along the center radius of the tooth which are capable of receiving a pivot pin on various radial distances relative to the gear tooth profile for drawing various size gears.

These and other objects of the invention will become apparent by references to the following description of a draftsman's template particularly suitable for drawing gear teeth embodying the invention taken in connection with the accompanying drawing in which.

Figure 1:
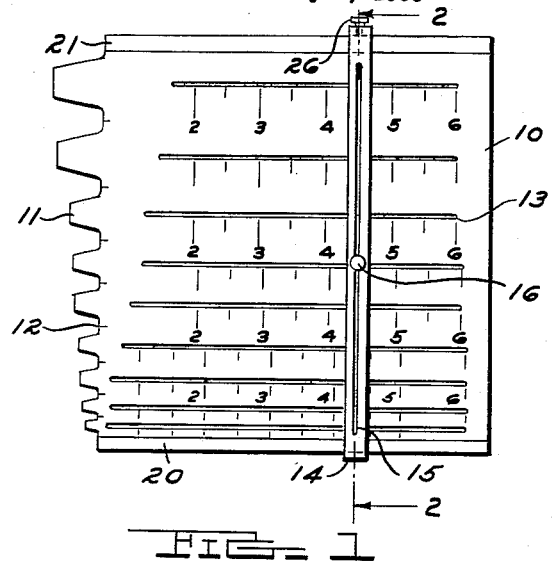
Fig. 1 is a top plan view of the inventive device.
Figure 2:
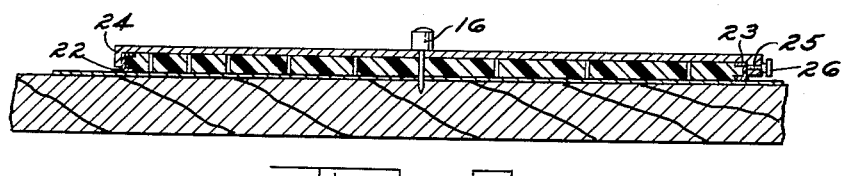
Fig. 2 is an enlarged cross-sectional view seen in Fig. 1 along the line 2—2 thereof showing a drawing board in conjunction therewith.

Referring now to the drawing, wherein like numerals refer to like and corresponding parts throughout the several views, the draftsman's template disclosed therein to illustrate the invention comprises a plate 10 having gear tooth profiles 11 disposed on one edge 12 thereof, radial slots 13 in the plate 10 disposed on the center radius of each gear tooth profile 11, a cross bar 14 movable across the face plate 10 in a direction parallel to the slots 13, a slot 15 in the bar 14 crossing the slots 13 in the plate 10 so as to form a communicating aperture through both the plate 10 and the bar 15 at the points of juncture between the bar slot 15 and the plate slots 13, a pin 16 disposable through both the plate 10 and bar 15 via the juncture of the slots 15 and 13, and a scale showing the radial distance of each gear tooth profile 11 having indicator markings along the slots 13 to establish the radial distance of the pin 16 relative to the selected tooth 11.

More particularly the plate 10 is equipped with a top edge 20 and a bottom edge 21 which have an overlying metal shield 22 and 23 respectively and the bar 14 has depending ends 24 and 25 overlying the edges 22 and 23 respectively with the bar end 25 being equipped with a clamping screw 26 clamping the bar 14 relative to the plate 10.

Figure 3:
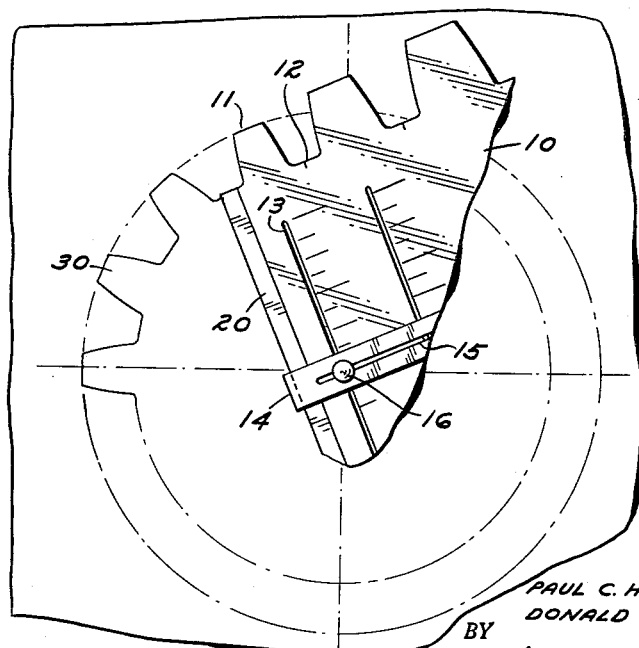
Fig. 3 is an enlarged partial top plan view of the device seen in Fig. 2, partly broken away, illustrating the template relative to the drawing being formed therewith.

In operation, the draftsman selects the desired tooth size, such as the tooth 11, and then establishes the radial distance outwardly therefrom via the graduation on the scale and moves the bar 14 so that the slot overlies the selected graduation thereby establishing the radius of the tooth 11; upon such location the clamping screw 26 is tightened fixing the relative position of the bar and plate whereupon the draftsman inserts the pin 16 into the proposed gear center, such as seen in Fig. 3, and then draws the teeth 30 on the drawing by tracing around the gear tooth 11 profile of the template and by swinging the template 10 around the center established by the pin 16 the tooth 11 remains on the said radial distance and swings on the same center and arc around the gear and in this regard each tooth drawn on the drawing is in the same relative angular relationship to the other teeth drawn on the drawing so that the tooth gear is easily and quickly drawn due to the fact that it is only necessary to swing the template around the pin to establish a very definite relationship of the teeth to each other around the periphery of the gear.

When the draftsman desires to draw another size gear with different size teeth it is only necessary for him to loosen the clamping screw 26 and move the bar 15 to align the slot 15 with the radial scale of the selected tooth and then to set the clamp screw 26; he then inserts the pin through the communicating plate and bar apertures of the selected tooth and then locates the pin 16 on the pivotal center established by the crossed slots locating the selected gear tooth on the selected radial distance on the selected center and the template is then established for drawing all the teeth around the periphery of the gear by locating the pin 16 on the gear center of the drawing.

The inventive template with these features constitutes a compact, durable, and neat appearing mechanism easily operated to draw selected gear teeth of various sizes at various radii around a definite center point so as to create and draw gear teeth on a drawing with ease and facility without the heretofore laborious effort and inaccuracies involved in repositioning a template every time a new gear tooth is outlined on a drawing.

Although but a single embodiment has been shown and described in detail, it is obvious that many changes may be made in the size, shape, detail, and arrangement of the various elements within the scope of the appended claim.

We claim:

A draftsman's template for drawing gear teeth comprising a plate, size graduated gear tooth profiles formed on said plate on a side thereof; said profiles having radial centers; said plate having slots extending from the radial center of each said tooth profile; a slotted cross-bar overlying said plate crossing said plate slots at right angles; the crossed slots of said plate and bar opposite said tooth profile forming a communicating aperture through said plate and bar on the radial center line of each said tooth profile; said bar being movable on said plate in a direction parallel to said slots for spacing said communicating apertures on various selected radii relative to said tooth profile; and a pin lying in one said aperture constituting the circular center of a radius relative to a selected tooth profile; and means for securing said bar relative to said plate in the selected adjusted relative position.

References Cited in the file of this patent

UNITED STATES PATENTS

| | | |
|---|---|---|
| 776,340 | Moon | Nov. 29, 1904 |
| 1,211,793 | Horvath | Jan. 9, 1917 |
| 1,825,266 | Fischer | Sept. 29, 1931 |

OTHER REFERENCES

Rapi Design Catalogue No. 55, Rapi Design Inc., Box 592, Glendale, Calif. (Copy in Div. 66), p. 2, Stencil No. 80.